J. M. HOFFNER.
TRANSPORTATION TICKET.
APPLICATION FILED MAY 3, 1909.

1,029,293.

Patented June 11, 1912.

Witnesses:

John M. Hoffner, Inventor.

Attorney.

UNITED STATES PATENT OFFICE.

JOHN M. HOFFNER, OF BUFFALO, NEW YORK.

TRANSPORTATION-TICKET.

1,029,293.　　　　　Specification of Letters Patent.　　Patented June 11, 1912.

Application filed May 3, 1909. Serial No. 493,564.

*To all whom it may concern:*

Be it known that I, JOHN M. HOFFNER, a citizen of the United States, and resident of Buffalo, in the county of Erie and State of New York, have invented certain new and useful Improvements in Transportation-Tickets, of which the following is a specification.

My invention relates to an improvement in transportation tickets and more particularly to tickets of this class known as "transfers"; such for instance, as are used by street railway companies from whom passengers purchase a right to travel upon their cars and continue their passage on a second car to which the transfer is issued by the conductor of the first car.

The object of this invention is to produce a transfer that will make easy the detection of its use by another person and which will obviate all liability of abuse or alteration and prevent fraud of any kind.

It also has for its object the production of a transportation ticket which provides a conductor's stub so that any alterations or fraud which might be attempted, may be readily detected, and so that the party perpetrating such fraud or making alterations upon the transfer, can be convicted upon the evidence retained by the conductor's stub.

It furthermore has for its object the production of a transfer wherein the line to which it is issued will always appear at the top of the same; also the location of the point of transfer.

With these and other objects in view, the invention consists in the particular arrangement herein shown and described and particularly pointed out in the subjoined claims.

Figure 1 is a face view of the complete ticket. Fig. 2 is a face view of the conductor's stub or the upper portion of the ticket. Fig. 3 is a rear view of the same. Fig. 4 is a face view of the passenger's portion of the ticket. Fig. 5 is a rear view of the same.

In describing the invention, the ticket considered as a whole is designated by the letter A in Fig. 1, and it is to be severed transversely to provide the conductor's stub, designated B, in Figs. 2 and 3, and the passenger's portion or transfer, designated C, in Figs. 4 and 5.

On the face of the ticket, a number of transversely-disposed lines D are printed which divide the ticket throughout the greater portion of its length into a series of transverse line-designating spaces E in which are noted the names of connecting lines on which the passenger's trip could be continued, if properly designated. In each of said spaces the point is also noted at which the transfer is to be made for the line designated, so that the passenger can readily see where he is to continue his trip and at the upper end of the ticket a space F is provided for the words "conductor's stub." Beneath the series of transverse spaces E and at the left marginal portion of the ticket is a space G sub-divided into thirteen spaces H, the uppermost of which contains the year of issue and the remaining twelve having the months of said year successively arranged thereon. To the right of said space G is a space I in which the name of the line from which the ticket or transfer is issued is placed, and it has matter therein noting that the line to which transfer is made is at the extreme top of that portion of the ticket delivered to the passenger.

A space J is provided at the right of the space I which is continued up through the series of transverse line-designating spaces E and where said space passes through said transverse spaces, it is sub-divided into three longitudinal spaces or columns $j$, $j^1$, $j^2$; differently designated, such as by the numerals 1, 2, 3 noted at their upper ends, at K.

At the lower end of the space J, is a division L in which the words "Straight cut indicates hour punched" are noted, and between said division L and the longitudinal columns $j$, $j^1$, $j^2$ is a division M containing the words "Pointer over column 3 (45) min. after hour" arranged in line with the longitudinal column $j^2$ marked "3", the words "Pointer over column 2, (30) min. after hour" in line with the longitudinal column $j^1$ marked "2", and the words "Pointer over column 1, (15) min. after hour" in line with the longitudinal column $j$ marked "1". The columns $j$, $j^1$, $j^2$ may well be termed minute or fractional-hour columns, since by them it is intended to designate the sub-divisions of the hour punched to which the transfer will be acceptable on the line to which it is issued.

To the right of the space J, the hours of the day are designated; two vertical rows of figures, 1 to 12 being provided; one showing dark figures upon a white field N and designated A. M. at the head, and the other showing light figures in a dark field N¹ and designated P. M. at the head. At the extreme lower end of the ticket, is a space O divided into 31 spaces designating the 31 days of the month. On the face of the ticket, in the space F at the upper end thereof, the number of the ticket is noted as at P; and a corresponding number is noted at or near the lower end of the ticket on the rear side thereof, as at R.

When issuing a transfer to a passenger, the conductor ascertains the line over which the passenger desires to continue his trip. He then severs the transfer on the division line D directly above the space bearing the name of the line to which the transfer is to be issued; thus showing that the line noted in the space at the top of the transfer or passenger's portion of the ticket denotes the line over which the trip may be continued and as the point at which the transfer is to be made is noted in the same space, it is always easy for the passenger to ascertain whether the transfer has been correctly issued.

For the purpose of severing the transfer, I have provided an improved combination punch and shears which is the subject of a co-pending application for patent; and by means of which punch and shears, the uppermost space of the passenger's portion of the ticket is punched simultaneously with the severing of the ticket so that it is impossible for a person to cut off one or more spaces at the upper end of the transfer or passenger's portion of the ticket for the purpose of using the same on some other line noted below, as without the punch hole in the uppermost space, the transfer would not be acceptable upon the line on which the trip was to be continued; and as this punch-hole is to correspond in outline to that used in punching the hour in the white field N or dark field N¹, it is quite clear that alteration of this transfer cannot well be resorted to without immediate detection.

The month of the year and the day of the month on which issue of the transfer is made, are punched in the spaces G and O, respectively. This, however, need not be done with the same punch, as it is customary to supply to conductors with the transfers at the beginning of each day's work with the month and date of issue punched out or otherwise marked upon the transfer.

On the rear of the ticket are noted the names of the various lines appearing on the face of the same; but they are so arranged that each name is one space higher than the corresponding name on the face of the ticket, as clearly shown in Figs. 3 and 4, wherein the name Ensign appears at the bottom of the conductor's stub on the rear side thereof directly in rear of the space on the face of said stub bearing the name Ewald, while the name Ensign appears at the top of the passenger's portion of the ticket on the face thereof. This shows that the line to which ticket Number 841 has been issued, was line Ensign and in the attempt of a person changing the transfer or passenger's portion to some other line, the company will have positive proof, upon receipt of the transfer in the auditor's office, that the same had been tampered with, and upon arrest of the person, will be sure of a conviction, since the conductor's stub will clearly show that the correspondingly numbered transfer or passenger's portion of the ticket will not mate with it.

The first minute or fractional-hour column marked "1" at its upper end, denotes 15 min. after the hour punched; the second marked "2" at its upper end, denotes 30 min. after the hour punched, while the third marked "3" at its upper end, denotes 45 min. after the hour punched; and these columns are to be used in connection with the hour columns N, N¹ bearing the numerals 1 to 12 under A. M. and P. M.

As above stated, a specially designed punch and shears is provided to sever the ticket; and this shears is so constructed that in severing the ticket, it leaves a notch S on the severed edge of one of the sections and a lip or projection T on the other section. In the particular ticket illustrated, the lip or projection P is shown on the severed edge of the transfer or passenger's portion of the ticket, while the notch O is shown on the conductor's stub. Both the lip and notch are in line with the first longitudinal minute or fractional-hour space marked "1", and denotes that the transfer will be acceptable not later than 15 min. after the hour and since the numeral "4" is punched in the "A. M." hour column N, it shows that the transfer or passenger's portion shown in Fig. 4 will be accepted upon the Ensign line, not later than 4:15 a. m.

A transfer issued between 4:15 a. m. and 4:30 a. m. would have the lip or projection P and the notch S in line with the second longitudinal minute or fractional-hour column, marked "2" at the top, denoting that the transfer will be accepted not later than 4:30 a. m.; while a transfer issued between 4:30 a. m. and 4:45 a. m. would have the lip or projection P and the notch S in line with the third longitudinal minute or fractional-hour column, marked "3" at the top, denoting that the transfer will be accepted not later than 4:45 a. m. When a transfer issued is acceptable on the hour, the ticket is severed by a straight line; but in each instance it is preferable to have the uppermost space E on the transfer punched so that the same cannot be altered so as to be used upon any of the lines noted in the succeeding spaces. This transfer makes it very convenient for the conductor on the second car as it will not be necessary for him to scrutinize the same carefully to ascertain whether his line has been properly punched, as the line always appears at the top of the transfer and the lip or projection will denote the division of the hour to which the ticket should be accepted. It is also to be noted that transfers issued to different lines from any one line, as well as the conductor's stub, are always of different length; the conductor's stub being long when the transfer is short.

In transfers now in use, it is quite difficult to convict a person for altering or otherwise fraudulently manipulating the same, as the conductor issuing a transfer has no evidence to prove that he issued a certain transfer to a certain person, but with this transfer, it will be very easy to convict a person upon whom suspicion might rest that the transfers he receives are being turned over to another person, or that they are being fraudulently manipulated, as it will only be necessary for the conductor to particularly notice the person to whom a certain numbered transfer is issued so that he can identify him when called upon, and for the conductor on the second car receiving the transfer, to likewise note the person from whom he accepts or who offers the transfer-portion, so that he may also identify him; and as the transfer portion and conductor's stub are similarly numbered and the severed edges correspondingly cut, there would be no trouble in convicting such person or persons.

While I have shown a lip or projection on one of the portions of the ticket, and a notch on the other, it is quite clear that the fraction of the hour may be otherwise noted and that the uppermost line-designating space E may be otherwise punched or marked with a view of preventing tampering with the transfer.

Having thus described my invention, what I claim is,—

1. A ticket of the character described having a list of similar name designations printed lengthwise on each face, each name in one list being stepped one space longitudinally with respect to the identical name in the other, the obverse side of said ticket having also columns arranged lengthwise indicating different periods of time, said ticket being adapted to be divided between any two names of the list on the obverse side and at right angles to said columns, said ticket when divided having one portion provided with a lip or projection and the other with a notch, said lip or projection and said notch being in line with one of said columns.

2. A ticket having a portion thereof divided into transversely-disposed spaces, each bearing name designations, said ticket having similar name designations on its reverse side stepped one space longitudinally with respect to identical name designations on its obverse side and having also on said obverse side columns intersecting said transverse spaces and indicating periods of time, said ticket being adapted to be divided between any two adjoining transverse spaces.

3. A ticket of the character described adapted to be divided transversely and having a longitudinal row of similar name designations printed on each face but stepped one space longitudinally with respect to each other so that when divided transversely between said name designations, the uppermost designation on the obverse face of one portion of the ticket is the same as the lowermost designation on the reverse face of the other portion of the ticket, the obverse face of said ticket having also longitudinal columns indicating periods of time, the time being indicated by dividing the ticket by an irregular line having the irregularity in line with one of said columns to indicate the time of expiration of the ticket.

4. A ticket of the character described adapted to be divided transversely and having lines on its face dividing a portion thereof into intersecting transversely-disposed spaces and longitudinally-disposed columns and designations in said spaces for indicating car lines upon which the ticket may be used, said columns being suitably designated for indicating periods of time, said ticket being adapted to be divided on one of the lines between the transverse spaces in a manner to leave an irregularity at the divided edge of both portions in line with one of said columns.

In testimony whereof, I have affixed my signature in the presence of two subscribing witnesses.

JOHN M. HOFFNER.

Witnesses:
 ELLA C. PLUECKHAHN,
 CHRIST FEINLE, Jr.

Copies of this patent may be obtained for five cents each, by addressing the "Commissioner of Patents, Washington, D. C."